US012586874B2

(12) United States Patent
Matsumasa et al.

(10) Patent No.: US 12,586,874 B2
(45) Date of Patent: Mar. 24, 2026

(54) SECONDARY BATTERY AND METHOD OF MANUFACTURING THE SAME

(71) Applicant: PRIME PLANET ENERGY & SOLUTIONS, INC., Tokyo (JP)

(72) Inventors: Yoshitaka Matsumasa, Takatsuki (JP); Tomokazu Yamanaka, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 495 days.

(21) Appl. No.: 18/151,005

(22) Filed: Jan. 6, 2023

(65) Prior Publication Data

US 2023/0231286 A1 Jul. 20, 2023

(30) Foreign Application Priority Data

Jan. 14, 2022 (JP) ................................. 2022-004382

(51) Int. Cl.
*H01M 50/536* (2021.01)
*H01M 50/54* (2021.01)
*H01M 50/533* (2021.01)

(52) U.S. Cl.
CPC ......... *H01M 50/536* (2021.01); *H01M 50/54* (2021.01); *H01M 50/533* (2021.01)

(58) Field of Classification Search
CPC .. H01M 50/533; H01M 50/536; H01M 50/54; B23K 26/21
USPC ........................ 429/161; 219/121.63, 121.64
See application file for complete search history.

(56) References Cited

U.S. PATENT DOCUMENTS

| | | | |
|---|---|---|---|
| 2012/0248076 A1 | 10/2012 | Hosokawa et al. | |
| 2014/0087225 A1 | 3/2014 | Zhang et al. | |
| 2018/0063955 A1* | 3/2018 | Werley et al. ......... | H05K 3/328 |

FOREIGN PATENT DOCUMENTS

| | | |
|---|---|---|
| CN | 102683634 A | 9/2012 |
| DE | 10 2018 207693 A1 | 11/2019 |
| JP | H 08-332584 A | 12/1996 |
| JP | 2012-213789 A | 11/2012 |
| JP | 2014-136242 A | 7/2014 |
| JP | WO2013/160932 A1 | 12/2015 |
| JP | 2019-061949 A | 4/2019 |
| JP | 2019-067570 A | 4/2019 |
| WO | WO 2019/219715 A2 | 11/2019 |

* cited by examiner

*Primary Examiner* — Kevin P Kerns

(74) *Attorney, Agent, or Firm* — Finnegan, Henderson, Farabow, Garrett, and Dunner, LLP

(57) ABSTRACT

Provided is a technique to reduce voids between an electrode tab and a current collecting unit in a portion where the electrode tab and the current collecting unit are welded. The secondary battery manufacturing method disclosed herein is a method of manufacturing a secondary battery including an electrode body having an electrode tab and a current collecting unit electrically connected to the electrode body. This method includes: welding between the electrode tab and the current collecting unit, by sandwiching the electrode tab between a transparent material and the current collecting unit and then applying laser to penetrate the transparent material.

8 Claims, 5 Drawing Sheets

SECONDARY BATTERY AND METHOD OF MANUFACTURING THE SAME

CROSS REFERENCE TO RELATED APPLICATIONS

The present application is based upon and claims the benefit of priority from Japanese patent application No. 2022-004382 filed on Jan. 14, 2022, and the entire disclosure of which is incorporated herein in its entirety by reference.

BACKGROUND OF THE DISCLOSURE

1. Technical Field

The present disclosure relates to a secondary battery and a method of manufacturing the same.

2. Background

A second battery includes: an electrode body having electrode tabs; and a current collecting unit electrically connected to the electrode body via the electrode tabs. The electrode tabs and the current collecting unit may be bonded to each other by laser welding, for example. Japanese Patent Application Publication Nos. 2019-67570, 2019-61949, and 2014-136242 disclose using a welding jig provided with a through hole in such laser welding. In the laser welding in these publications, the electrode tabs and the current collecting unit are stacked, and the welding jig is then placed on the electrode tabs stacked on the current collecting unit, and the electrode tabs are pressed. Then, laser is applied to the inside of the through hole in the welding jig, thereby bonding (welding) between the electrode tabs and the current collecting unit.

SUMMARY OF THE INVENTION

The present inventors consider substantially reducing voids (welding failure portions) between the electrode tabs and the current collecting unit in a portion where the electrode tabs and the current collecting unit are welded.

A secondary battery manufacturing method disclosed herein is a method of manufacturing a secondary battery including an electrode body having an electrode tab and a current collecting unit electrically connected to the electrode body via the electrode tab. This method includes: welding between the electrode tab and the current collecting unit by sandwiching the electrode tab between a transparent material and the current collecting unit and then applying laser to penetrate the transparent material.

In the method with such a configuration, the electrode tab is sandwiched between the transparent material and the current collecting unit, and a laser is then applied to penetrate the transparent material, thereby welding between the current collecting unit and the positive electrode tab. When the electrode tab is sandwiched between the transparent material and the current collecting unit, the transparent material is disposed on the electrode tab stacked on the current collecting unit, and the electrode tab is stacked on the current collecting unit without a gap. Then, laser is applied to penetrate the transparent material. Accordingly, the electrode tab is laser-welded to the current collecting unit stacked thereon without a gap. This allows reduction in voids in a welded zone between the electrode tab and the current collecting unit.

In a preferred aspect of the secondary battery manufacturing method disclosed herein, the electrode tab of the electrode body includes multiple electrode tabs. In this aspect, the multiple electrode tabs are sandwiched between the current collecting unit and the transparent material with the multiple electrode tabs stacked on each other. With such a configuration, an effect of reducing voids in the welded zone between the electrode tab and the current collecting unit is better realized.

In another preferred aspect of the secondary battery manufacturing method disclosed herein, in the welding, the laser is applied with the electrode tab, which is pressed with a pressure of 100 N or more by using the transparent material. With such a configuration, an effect of reducing voids in the welded zone between the electrode tab and the current collecting unit is better realized.

In another preferred aspect of the secondary battery manufacturing method disclosed herein, a diameter of a contact surface of the transparent material with the electrode tab is larger than a diameter with which the laser is applied (hereinafter referred to as an "irradiation diameter") of the laser. With such a configuration, an effect of reducing voids in the welded zone between the electrode tab and the current collecting unit is better realized.

Another preferred aspect of the secondary battery disclosed herein further includes: washing a contact surface of the transparent material with the electrode tab after the welding. With such a configuration, an effect of reducing voids in the welded zone between the electrode tab and the current collecting unit is better realized.

In another preferred aspect of the secondary battery manufacturing method disclosed herein, the transparent material has a melting point of 800° C. or more. With such a configuration, more stable welding between the electrode tab and the current collecting unit is realized.

In another preferred aspect of the secondary battery manufacturing method disclosed herein, the transparent material is crystallized glass, quartz glass, barium fluoride glass, calcium fluoride glass, or sapphire glass. Such a transparent material is suitable to realize the effect of the technology disclosed herein.

A secondary battery including an electrode body including an electrode tab and a current collecting unit electrically connected to the electrode body via the electrode tab is further disclosed. In the secondary battery, the electrode tab is laser-welded to the current collecting unit. In a welded zone between the electrode tab and the current collecting unit, the electrode tab and the current collecting unit are welded to each other without a gap. In the secondary battery with such a configuration, voids generated in the welded zone between the electrode tab and the current collecting unit are reduced.

In a preferred aspect of the secondary battery disclosed herein, the electrode tab of the electrode body includes multiple electrode tabs. The multiple electrode tabs are welded to the current collecting unit with the multiple electrode tabs stacked on each other. In the secondary battery with such a configuration, voids in the welded zone between the electrode tab and the current collecting unit is further reduced.

DETAILED DESCRIPTION OF THE PREFERRED EMBODIMENTS

Figure 1:
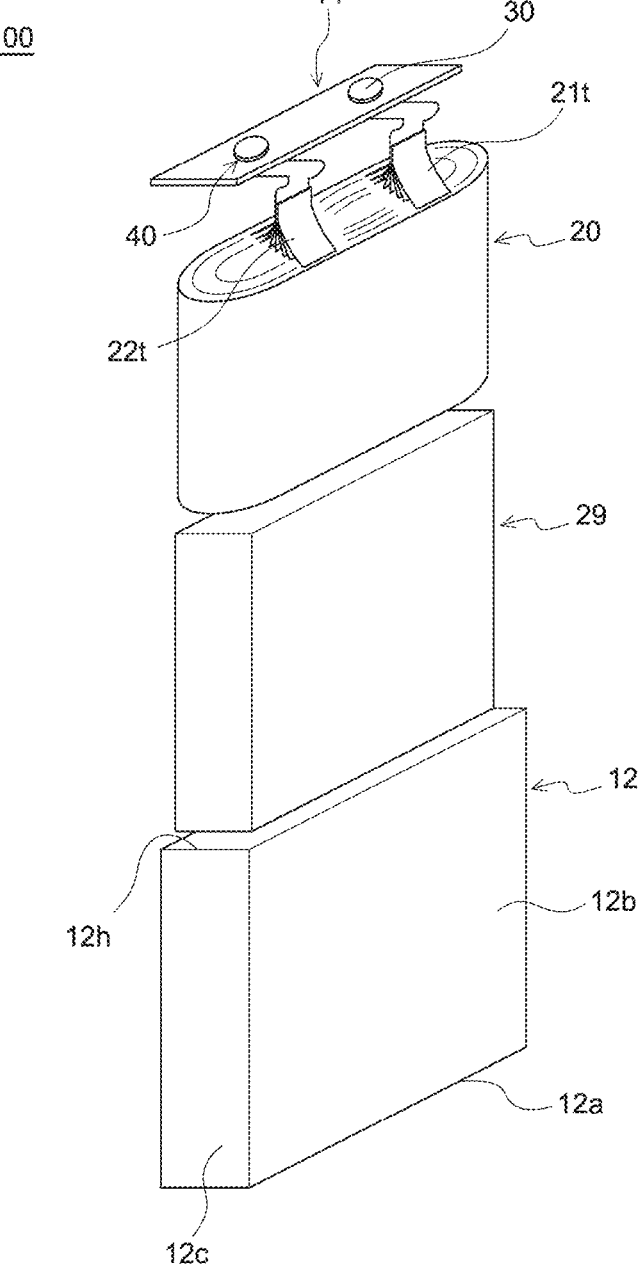
FIG. 1 is an exploded perspective view of a secondary battery 100.

The following describes an embodiment of the present disclosure. The embodiment described herein is naturally not intended to limit the present disclosure. Each drawing has been schematically illustrated and therefore may not necessarily reflect actual elements. The expression "A to B" indicating a numerical range means "A or more to B or less," and also means "above A and below B" unless otherwise specified. In the drawings described below, the same members/portions which exhibit the same action are denoted by the same reference numerals, and the duplicated descriptions may be omitted or simplified.

The "secondary battery" herein generally refers to an electricity storage device which causes a charging and discharging reaction by movement of charge carriers between a pair or electrodes (a positive electrode and a negative electrode) via an electrolyte. The "secondary battery" herein encompasses so-called secondary batteries such as a lithium-ion secondary battery, a nickel hydride battery and a nickel cadmium battery, and capacitors such as an electric double-layer capacitor The following describes the embodiment of the secondary battery and the method of manufacturing the same disclosed herein, using a lithium-ion secondary battery as an example among secondary batteries. The disclosure herein is not limited to the lithium-ion secondary battery and can be applied to other secondary batteries, unless otherwise mentioned.

Figure 2:
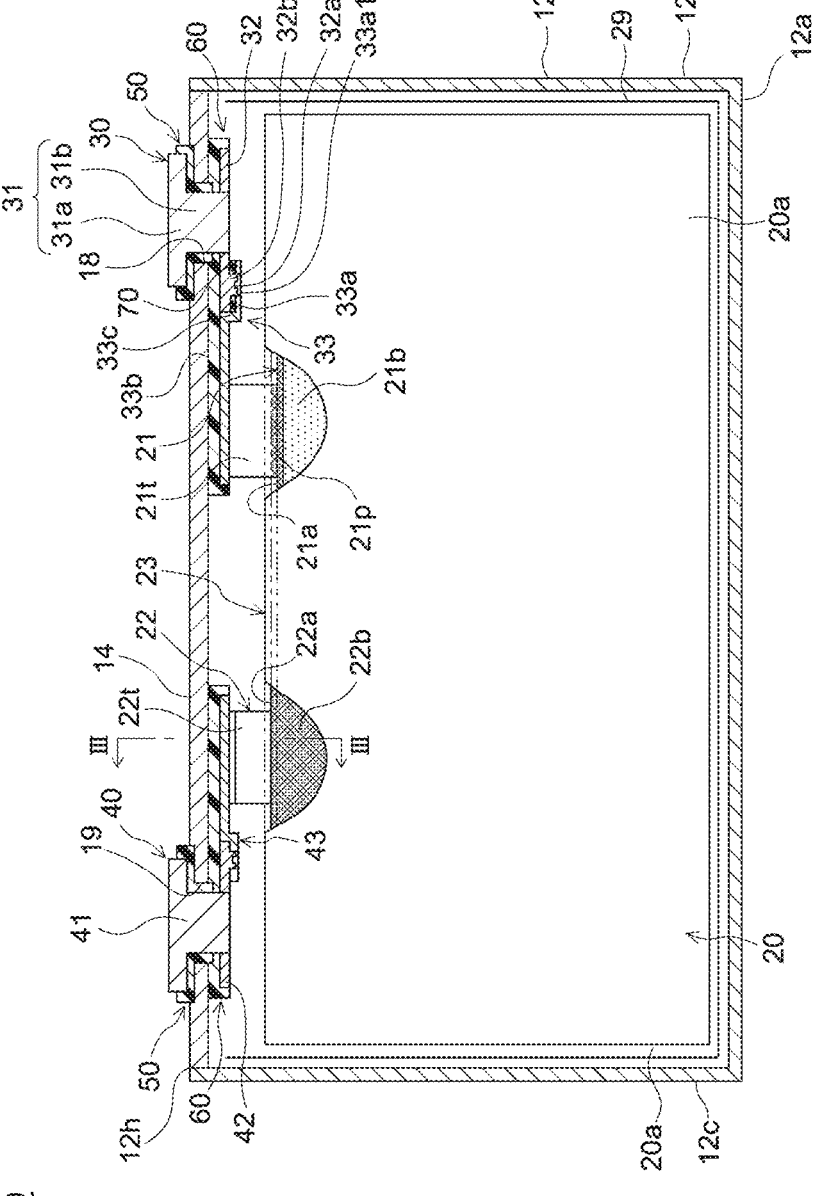
FIG. 2 is a partial cross-sectional view of the secondary battery 100.
Figure 3:
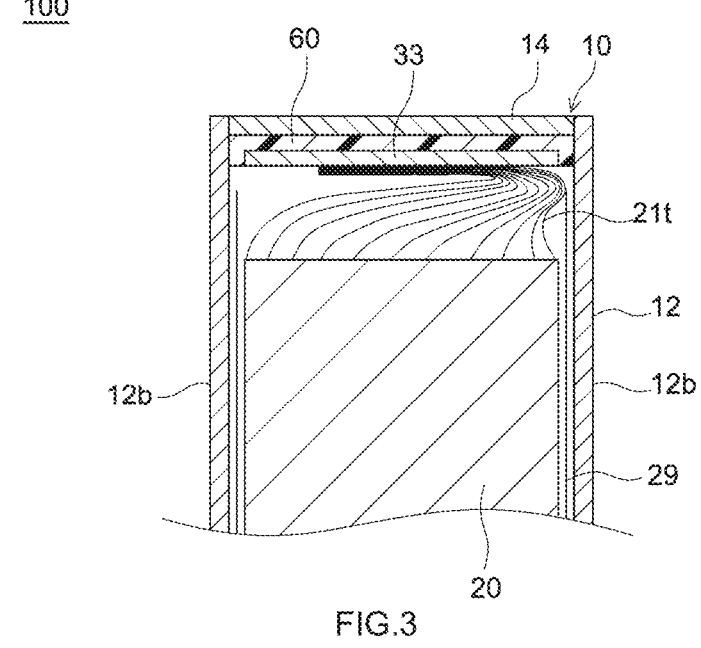
FIG. 3 is a cross-sectional view taken along line II-III of FIG. 2.

FIG. 1 is an exploded perspective view of a secondary battery 100. FIG. 2 is a partial cross-sectional view of the secondary battery 100. FIG. 2 is a schematic partial cross-sectional view of the state where the inside of the secondary battery 100 is exposed along one wide surface 12*b* of a substantially cuboid battery case 10. FIG. 3 is a cross-sectional view taken along line III-III of FIG. 2. FIG. 3 is a schematic partial cross-sectional view of the state where the inside of the secondary battery 100 is exposed along one narrow surface 12*c* of the substantially cuboid battery case 10. The secondary battery 100 shown in FIG. 1 is a so-called sealed battery where the battery case 10 housing the electrode body 20 is sealed. As shown in FIG. 1, the secondary battery 100 includes the battery case 10 and the electrode body 20.

The electrode body 20 is a power generation element of the secondary battery 100. As shown in FIGS. 1 to 3, the electrode body 20 is housed in the battery case 10 with being covered with an insulation film 29. As shown in FIG. 2, the electrode body 20 includes a positive electrode sheet 21 as a positive electrode element, a negative electrode sheet 22 as a negative electrode element, and a sheet-like separator 23. The separator 23 is disposed between the positive electrode sheet 21 and the negative electrode sheet 22. The positive electrode sheet 21, the negative electrode sheet 22, and the separator 23 are each a long strip-like member.

The positive electrode sheet 21 includes a long strip-like positive electrode current collector foil 21*a* (e.g., an aluminum foil) and positive electrode active material layers 21*b* formed on both surfaces of the positive electrode current collector foil 21*a*. In this embodiment, the positive electrode active material layers 21*b* are formed on the positive electrode current collector foil 21*a* in a constant width. The positive electrode active material layer 21*b* contains, for example, a positive electrode active material. For lithium-ion secondary batteries, the positive electrode active material is, for example, a material that can release lithium ions during charging and absorb lithium ions during discharging, such as a lithium transition metal composite. For the positive electrode active material, various kinds besides the lithium transition metal composite material are generally proposed without particular limitations. As shown in FIG. 2, the positive electrode sheet 21 has a positive electrode tab 21*t*. The positive electrode tab 21*t* is, for example, a portion of the positive electrode current collector foil 21*a*, and is an active material layer unformed portion where the positive electrode active material layer 21*b* is not formed thereon. In this embodiment, the positive electrode tab 21*t* is a rectangular portion protruding from one end along a sheet lateral direction. In the embodiment shown in FIG. 2, multiple positive electrode tabs 21*t* are provided intermittently in the sheet longitudinal direction.

In the embodiment, a positive electrode protective layer 21*p* is formed on the boundary between the positive electrode active material layer 21*b* and the positive electrode tabs 21*t*. The positive electrode protective layer 21*p* herein is formed at the end of the positive electrode active material layer 21*b* in the protruding direction of the positive electrode tabs 21*t*, and is adjacent to the positive electrode tabs 21*t*. The positive electrode protective layer 21*p* contains, for example, an inorganic filler such as alumina. The positive electrode protective layer 21*p* is not essential, and may be omitted in other embodiments.

The negative electrode sheet 22 includes a long strip-like negative electrode current collector foil 22*a* (e.g., a copper foil) and negative electrode active material layers 22*b* formed on both surfaces of the negative electrode current collector foil 22*a*. In this embodiment, the negative electrode active material layers 22*b* are formed on the negative electrode current collector foil 22*a* in a constant width. The negative electrode active material layer 22*b* contains, for example, a negative electrode active material. For lithium-ion secondary batteries, the negative electrode active material is, for example, a material that absorbs lithium ions during charging and releases the absorbed lithium ions during discharging, such as natural graphite. For the negative electrode active material, various kinds besides the natural graphite are generally proposed without particular limitations. As shown in FIG. 2, the negative electrode sheet 22 has a negative electrode tab 22*t*. The negative electrode tab 22*t* is, for example, a portion of the negative electrode current collector foil 22*a*, and is an active material layer unformed portion where the negative electrode active material layer 22*b* is not formed thereon. In this embodiment, the negative electrode tab 22*t* is a rectangular portion protruding from one end along a sheet lateral direction. In the embodiment shown in FIG. 2, multiple negative electrode tabs 22*t* are provided intermittently in the sheet longitudinal direction.

The separator sheet 23 may be a porous resin sheets through which an electrolyte with a desired heat resistance can pass. For the separator sheet 23, various kinds are proposed without particular limitations.

For example, the width of the negative electrode active material layer 22b in the sheet lateral direction (the direction along the narrow surfaces 12c in FIG. 2) is larger than the width of the positive electrode active material layer 21b in the same direction. The width of the separator sheet 23 in the sheet lateral direction is larger than the width of the negative electrode active material layer 22b. As shown in FIG. 2, the positive electrode tab 21t and the negative electrode tab 22t each have a required length to protrude from the separator 23. In this embodiment, the positive electrode tab 21t and the negative electrode tab 22t face the same side in the sheet lateral direction. The positive electrode sheet 21, the negative electrode sheet 22, and the separator 23 are aligned in the length direction and wound up in turn on top of each other. In this embodiment, the electrode body 20 is a so-called wound electrode body. The negative electrode active material layer 22b covers the positive electrode active material layer 21b with the separator 23 interposed therebetween. The negative electrode active material layer 22b is covered with the separator 23.

As shown in FIG. 1, the above-mentioned electrode body 20 is flat along one plane including the winding axis so as to be housed in the case body 12 of the battery case 10. The positive electrode tab 21t and the negative electrode tab 22t are disposed on one side (here the lid 14 side) of the electrode body 20 along the winding axis. The multiple positive electrode tab 21t and multiple negative electrode tab 22t are stacked and connected to the current collecting units 33 and 43 (to be described later) of the same polarity.

As shown in FIGS. 1 to 3, the case body 12 houses the electrode body 20, and has an opening 12h for housing the electrode body 20. The case body 12 has an opening in one side surface and a substantially cuboid square shape. As shown in FIGS. 1 to 3, the case body 12 has a substantially rectangular bottom surface 12a, a pair of wide surfaces 12b, and a pair of narrow surfaces 12c. The pair of wide surfaces 12b are standing from the longer side of the bottom surface 12a. The pair of narrow surfaces 12c are standing from the shorter side of the bottom surface 12a. The opening 12h is surrounded by the wide surfaces 12b in pair as longer sides and the narrow surfaces 12c in pair as shorter sides. In this embodiment, the case body 12 and a lid 14 to be described later are formed of aluminum or an aluminum alloy mainly containing aluminum in order to reduce weight and ensure the required rigidity.

The battery case 12 may house an electrolyte together with the electrode body 20. The electrolyte used may be a nonaqueous electrolyte obtained by dissolving a supporting electrolyte in a nonaqueous solvent. Examples of the nonaqueous solvent include carbonate solvents such as ethylene carbonate, dimethyl carbonate, and ethyl methyl carbonate. Examples of the supporting electrolyte include fluorine-containing lithium salts such as $LiPF_6$.

The lid 14 is attached to the opening 12h of the case body 12. The outer edge of the lid 14 is bonded to the edge of the opening 12h of the case body 12. Such bonding may be performed, for example, by continuous welding without a gap. Such welding can be realized, for example, by laser welding. The case body 12 and the lid 14 each have a size according to the number of electrode bodies housed (one or multiple, one in this embodiment), the size of the electrode body, and the like. Although illustration is omitted, the lid 14 is provided with a liquid injection hole and a gas discharge valve. The liquid injection hole is for injecting an electrolyte after bonding the lid 14 to the case body 12. The liquid injection hole is sealed with a sealing member. The gas discharge valve is a thin portion configured to be broken and to discharge gas inside the secondary battery 100 to the outside when the pressure inside the secondary battery 100 exceeds a predetermined value.

In this embodiment, the positive electrode terminal 30 and the negative electrode terminal 40 are attached to the lid 14. The positive electrode terminal 30 includes an external terminal 31, a connection member 32, and a current collecting unit 33. The negative electrode terminal 40 includes an external terminal 41, a connection member 42, and a current collecting unit 43. The external terminal 31 and the external terminal 41 are attached to the outside of the lid 14 via an external insulating member 50. The connection member 32 and the current collecting unit 33, and the connection member 42 and the current collecting unit 43 are attached to the inside of the lid 14 via the internal insulating members 60 provided on the respective polarity sides. The connection member 32, the current collecting unit 33, the connection member 42, and the current collecting unit 43 are disposed along the inner surface of the lid 14. The current collecting unit 33 is connected to the positive electrode sheet 21 of the electrode body 20 via the positive electrode tabs 21t. The current collecting unit 43 is connected to the negative electrode sheet 22 of the electrode body 20 via the negative electrode tabs 22t. The external terminal 31, the connection member 32, and the current collecting unit 33 on the positive electrode side are made of, for example, aluminum or an aluminum alloy. The external terminal 41, the connection member 42, and the current collecting unit 43 on the negative electrode side are made of, for example, copper or a copper alloy.

Each of the positive electrode tabs 21t and the negative electrode tabs 22t is, as shown in FIG. 2, attached to the current collecting unit 33 or 43 of the same polarities attached to each side of the lid 14 in the long side direction. The electrode body 20 is housed in the case body 12 with being attached to the lid 14 via the electrode tabs. As shown in FIGS. 1 and 2, the electrode body 20 is housed in the case body 12 so that the wide rectangular surfaces 20a face the wide surfaces 12b of the case body 12. The connection between the current collecting units and the electrode tabs will be described further later.

The following describes the terminal structure of the secondary battery 100 and the connection between the electrode body 20 and the lid 14 in detail. As shown in FIG. 2, the lid 14 has an attachment hole 18 attached to the external terminal 31. The attachment hole 18 penetrates the lid 14 at a predetermined position of the lid 14. The attachment hole 18 of the lid 14 is attached to the external terminal 31 via the external insulating member 50.

The external terminal 31 of the positive electrode includes a head 31a and a shaft 31b. The head 31a is a portion disposed outside the lid 14. The head 31a is a substantially flat portion larger than the attachment hole 18. The shaft 31b is a portion attached to the attachment hole 18 via the external insulating member 50. The shaft 31b protrudes downward from a substantially center portion of the head 31a (inward of the case body 12 in FIG. 2). As shown in FIG. 2, the tip of the shaft 31b is a portion crimped by the connection member 32 inside the lid 14. The tip of the shaft 31b is bent with being inserted into the attachment hole 18 of the lid 14 and the through hole 32a of the connection member 32, and is then crimped by the connection member 32.

As shown in FIG. 2, the external insulating member 50 is a member attached to the inner surface of the attachment hole 18 in the lid 14 and the outer surface of the lid 14. The external insulating member 50 is disposed between the lid 14 and the external terminal 31, and ensures insulation between them. The external insulating member 50 ensures airtightness between the lid 14 and the attachment hole 18. In light of this, materials with excellent chemical resistance and weather resistance are suitably used. In this embodiment, PFA is used for the external insulating member 50. PFA is a copolymer (tetrafluoroethylene perfluoroalkylvinylether copolymer) of tetrafluoroethylene and perfluoroalkoxyethylene. The material for the external insulating member 50 is not limited to PFA.

As shown in FIG. 2, the internal insulating member 60 is a member attached to the inside of the lid 14 around the attachment hole 18 in the lid 14. The internal insulating member 60 suitably has an appropriate chemical resistance because of being disposed inside the case body 12. In this embodiment, a polyphenylene sulfide resin (PPS) is used for the internal insulating member 60. The material for the internal insulating member 60 is not limited to PPS.

The connection member 32 has, for example, a substantially flat plate shape, and includes a through hole 32a and a protrusion 32b. The connection member 32 is a member attached to the internal insulating member 60 and connects between the external terminal 31 and the current collecting unit 33. The shaft 31b of the external terminal 31 is inserted into the through hole 32a. The shaft 31b is crimped around the through hole 32a. The protrusion 32b is a portion to be fitted into a through hole 33a1 provided in a first plate 33a of the current collecting unit 33. The shape of the protrusion 32b is a shape to be fitted into the through hole 33a1. In this embodiment, the plane shape of the protrusion 32b viewed from the inner surface of the lid 14 is ellipse.

The current collecting unit 33 is, as shown in FIGS. 2 and 3, attached to the lid 14 via the internal insulating member 60. The current collecting unit 33 includes a first plate 33a, a second plate 33b, and a step 33c. The first plate 33a is a portion disposed along the surface of the connection member 32. In this embodiment, the first plate 33a is a substantially flat plate-shaped portion. The first plate 33a has a through hole 33a1. The protrusion 32b of the connection member 32 is fitted into the through hole 33a1. The through hole 33a1 has a shape into which the protrusion 32b is fitted. The second plate 33b is a portion disposed on the internal insulating member 60. In this embodiment, the second plate 33b is a substantially flat plate-shaped portion. The positive electrode tabs 21t are bonded to the second plate 33b. The step 33c is a portion standing from one end of the first plate 33a to one end of the second plate 33b and connecting between both plates. In this embodiment, the step 33c is disposed along the side wall of the connection member 32.

Figure 4:
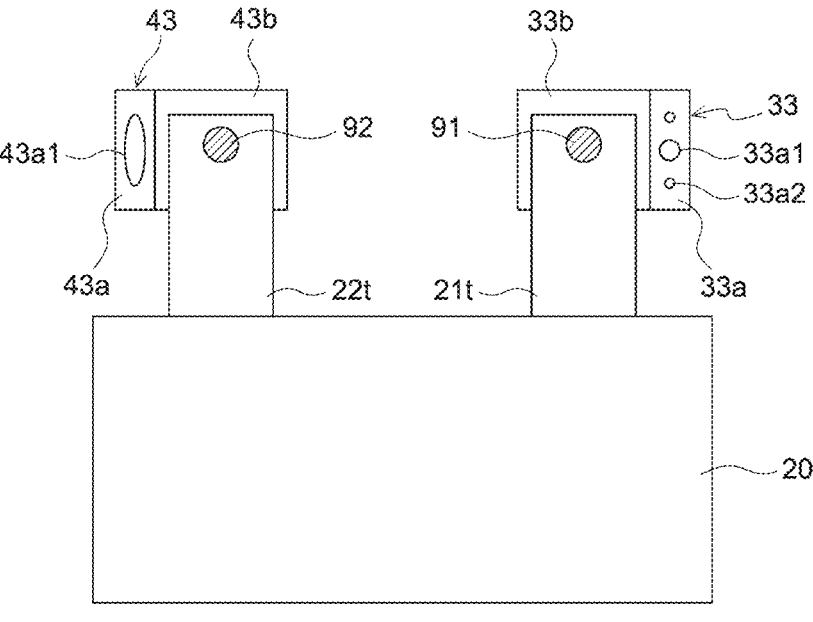
FIG. 4 is a plan view illustrating bonding between electrode tabs and current collecting units.

FIG. 4 is a plan view illustrating bonding between electrode tabs and current collecting units. As shown in FIGS. 3 and 4, multiple positive electrode tabs 21t extending from the electrode body 20 are disposed on the bonding surface of the second plate 33b with the positive electrode tabs 21t being stacked. As will be described later, at least portions of the positive electrode tabs 21t on their protruding tip sides are welded to the second plate 33b, thereby forming a welded zone 91. The welded zone 91 will be described in detail later.

Although not particularly limited thereto, as shown in FIG. 2, a resin-made fuse member 70 may be disposed between the connection member 32 and the first plate 33a of the current collecting unit 33. In this case, the first plate 33a of the current collecting unit 33 may be provided with a through hole 33a2 into which a protrusion provided in the fuse member 70 is attached (see FIG. 4).

As described above, the structure of the secondary batter 100 near the terminal on the positive electrode side is described above as an example. The structure of the secondary battery 100 near the terminal on the negative electrode side is also basically the same as that on the positive electrode side; thus, the description thereof is omitted. If the configuration on the negative electrode side differs from that on the negative electrode side, but does not characterize the technology disclosed herein, the description thereof is omitted. In FIG. 2, the reference numeral 19 on the negative electrode side refers to an "attachment hole." In FIG. 4, the reference numeral "43a" refers to a first plate, the reference numeral "43b" refers to a second plate, the reference numeral "43a1" refers to a through hole, and the reference numeral "92" refers to a welded zone."

When the electrode tabs and the current collecting unit are bonded by laser welding, the electrode tabs are stacked on the current collecting unit, and laser is then applied to the welding planned portion from the electrode tab side, and the electrode tabs and the current collecting unit are welded. The present inventors are found that voids (welding failure portions) are generated in a portion (welded zone) where the electrode tabs and the current collecting unit are welded in such laser welding. Such voids can be a factor of increasing the battery resistance.

Figure 5:
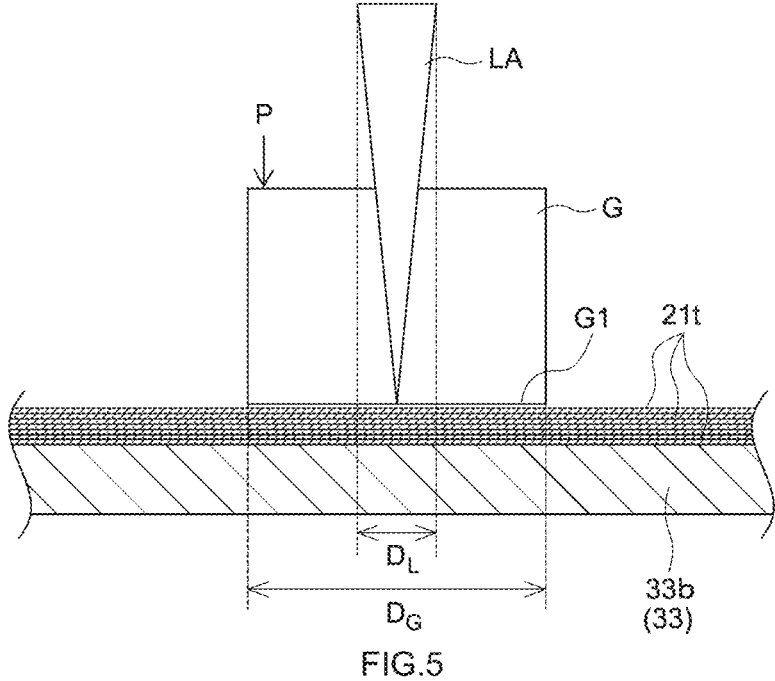
FIG. 5 is a schematic view illustrating welding between a positive electrode tab 21*t* and a current collecting unit 33.

FIG. 5 is a schematic view illustrating welding between positive electrode tabs 21t and a current collecting unit 33. In the method of manufacturing the secondary battery 100 disclosed herein, as shown in FIG. 5, electrode tabs 21t are sandwiched between the transparent material G and the current collecting unit 33, and then laser LA is applied to penetrate the transparent material G, thereby welding between the electrode tabs 21t and the current collecting unit 33. In FIG. 5, the welding between the positive electrode tabs 21t and the current collecting unit 33 is shown. However, the welding method disclosed herein can be applied to the bonding between the negative electrode tabs 22t and the current collecting unit 43 (see FIG. 4). According to such a welding method, as shown in FIG. 4, voids are less likely to be formed in welded zones 91 and 92 where the electrode tabs 21t and 22t and the current collecting units 33 and 43 are welded to each other.

In this embodiment, for example, the method of manufacturing the secondary battery 100 includes: preparing, disposing, sandwiching, pressurizing, welding, bending, housing, and sealing.

In the preparing, an electrode body 20 is prepared, for example. For example, a positive electrode sheet 21, a negative electrode sheet 22, and a separator 23 are provided, and the electrode body 20 is prepared by the known procedures. At this time, multiple positive electrode tabs 21t provided in the positive electrode sheet 21 are stacked, and multiple negative electrode tabs 22t provided in the negative electrode sheet 22 are stacked.

In the disposing, for example, the positive electrode tabs 21t and the current collecting unit 33 are stacked on each other. As shown in FIG. 5, the positive electrode tabs 21t stacked in the preparing are disposed on the second plate 33b of the current collecting unit 33 (see FIG. 4).

In the sandwiching, for example, the positive electrode tabs 21 are sandwiched between a transparent material G and the current collecting unit 33. As shown in FIG. 5, after the disposing, the transparent material G is disposed on the topmost surface of the positive electrode tabs 21t disposed on the second plate 33b. At this time, for example, the transparent material G is disposed to cover a welding planned portion where the positive electrode tabs 21t and the second plate 33b are planned to be welded. For example, when wrinkles are generated in the positive electrode tabs 21t, it is preferable that the winkles are stretched fully, and the transparent material G is then disposed.

The transparent material G may be made of a material through which laser can transmit, in the laser welding between the positive electrode tabs 21t and the current collecting unit 33. The light transmittance of the transparent material G at the wavelength of 900 nm to 1200 nm (e.g., 1070 nm) is, for example, 70% or more, preferably 80% or more, more preferably 90% or more, yet more preferably 95% or more, and the closer to 100% the better. The light transmittance of the transparent material G can be measured using a commercially available spectrophotometer.

The transparent material G may be made of a material which is not damaged by heat of the laser welding between the positive electrode tabs 21t and the current collecting unit 33. As the transparent material G, an appropriate material may be selected according to the materials of the positive electrode tab 21t and the current collecting unit 33. The transparent material G used is a transparent material having a melting point of 800° C. or more, for example. For example, when the positive electrode tabs 21t and the current collecting unit 33 are made of aluminum or an aluminum alloy, the transparent material having a melting point of 800° C. or more is preferably used. From a point of view of preventing damage caused by heat of the laser welding, the higher the melting point of the transparent material G, the better.

The transparent material G is, for example, an inorganic material. Suitable examples of the transparent material G can include crystallized glass (about 800° C.), quartz glass (about 900° C.), barium fluoride glass (about 1200° C.), calcium fluoride glass (about 1400° C.), and sapphire glass (about 2000° C.). The temperature in parentheses shown after each material name indicates the melting point of each material.

As shown in FIG. 5, the diameter $D_G$ of a contact surface G1 of the transparent material G with the positive electrode tabs 21t is set larger than an irradiation diameter $D_L$ of the laser LA. The diameter $D_G$ is, for example, the smallest diameter at the contact surface of the transparent material G. The irradiation diameter $D_L$ of the laser LA is, for example, a value set by a laser welding device. Examples of the shape of the transparent material G include a cylindrical shape and a polygonal prism shape. The shape and dimensions of the transparent material G are not limited to those described above as long as they are those with which at least a welding planned portion is covered.

In the pressurizing, for example, the positive electrode tabs 21t disposed on the current collecting unit 33 are pressed against the current collecting unit 33. For example, a predetermined pressure in the direction of arrow P shown in FIG. 5 is applied to the transparent material G. Thus, the positive electrode tabs 21t can be pressed against the second plate 33b. A means of pressing the positive electrode tabs 21t against the current collecting unit 33 by using the transparent material G is not particularly limited. The pressing means used may be, for example, any jig for spring load. The pressurizing is not necessarily performed. In other embodiments, the pressurizing may be omitted.

The magnitude of the pressure applied to the transparent material G in the pressurizing is not particularly limited, and may be set to 10 N to 200 N, for example. The pressure is, for example, preferably set to 100 N or more.

In the welding, the positive electrode tabs 21t and current collecting unit 33 are welded by applying laser, for example. As shown in FIG. 5, with a predetermined pressure in the direction of the arrow P applied to the transparent material G, laser LA is applied toward the welding planned portion to weld between the positive electrode tabs 21t and the second plate 33b. The irradiation diameter of the laser LA and the conditions of the output and the like are set, as appropriate, according to the materials of the positive electrode tabs 21t and the current collecting unit 33 to be subjected to laser welding, the number of the positive electrode tabs 21t, and the like.

Figure 6:
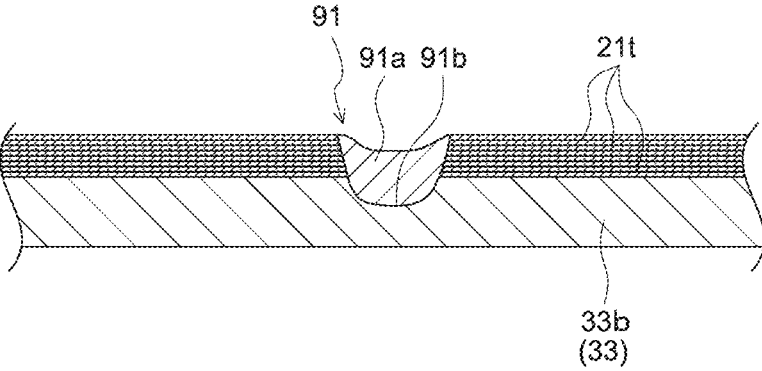
FIG. 6 is a cross-sectional view of an area near a welded zone 91.

By performing the welding, a welded zone 91 where the positive electrode tabs 21t and the second plate 33b are welded is formed, for example. The welded zone 91 is, for example, a portion where the positive electrode tab 21t and the current collecting unit 33 are melted and solidified, and thus bonded to each other. FIG. 6 is a cross-sectional view of an area near a welded zone 91. As shown in FIG. 6, in the welded zone 91, a portion 91a obtained by melting and solidifying the positive electrode tabs 21t and a portion 91b obtained by melting and solidifying the current collecting unit 33 are connected to each other, thereby achieving bonding (welding) between the positive electrode tabs 21t and the current collecting unit 33.

A kind of the laser LA is not particularly limited, and can be selected, as appropriate, according to constituent materials of the positive electrode tabs 21t and the current collecting unit 33. The laser LA can be a YAG laser, a $CO_2$ laser, a semiconductor laser, a disc laser, or a fiber laser. The irradiation diameter $D_L$ of the laser LA may be set to, for example 0.5 mm to 1.0 mm.

In this embodiment, in the welding, similar welding is performed also on the negative electrode side, thereby forming a welded zone 92 between the negative electrode tabs 22t and the current collecting unit 43. For example, when the negative electrode tabs 22t and the current collecting unit 43 are made of copper or a copper alloy, the transparent material having a melting point of 1200° C. or more is preferably used.

Although not particularly limited thereto, after the welding, the transparent material G can be reused at the time when laser welding between another positive electrode tab 21t and another current collecting unit 33 is performed. At this time, for example, the transparent material G (at least the surface G1 in contact with at least the positive electrode tabs 21t) may be washed for recycling.

In the attaching, for example, the electrode tabs and the current collecting units 33 and 43 of the same polarities as the electrode tabs are welded to each other, and the current collecting units 33 and 43 are then attached to the lid 14. For example, an integrated body obtained by attaching members except for the current collecting units 33 and 43 to the lid 14 is prepared in advance, and the current collecting unit 33 to which the positive electrode tabs 21t have been welded and the current collecting unit 43 to which the negative electrode tabs 22t have been welded are then attached to predetermined portions of the internal insulating member 60 of the integrated body.

In the bending, for example, the positive electrode tabs 21t and the negative electrode tabs 22t are bent after the current collecting units 33 and 43 [34] are attached to the lid 14 in the attaching. As shown in FIGS. 2 and 3, the positive electrode tabs 21t and the negative electrode tabs 22t are bent so that the positive electrode tabs 21t and the negative electrode tabs 22t are disposed along the wide surfaces 12b, when the electrode body 20 housed in the case body 12. Before the bending, multiple electrode tabs may be bundled if necessary.

In the housing, for example, the electrode body 20 is housed inside the case body 12. For example, after the bending, the electrode body 20 is wrapped in the insulation film 29 which has been formed into a bag shape in advance. Then, the electrode body 20 which has been wrapped in the insulation film 29 is housed in the case body 12.

In the sealing, for example, the battery case 10 is sealed. For example, after the electrode body 20 is housed, the lid 14 is stacked on the opening 12h of the case body 12, and the lid 14 and the case body 12 are then welded.

After the sealing, for example, an electrolyte is injected into the battery case 10 by the known method, and the liquid injection hole is sealed, and the battery case 10 is sealed in an airtight manner. Thereafter, for example, initial charging and an aging treatment are performed under predetermined conditions, thereby producing a secondary battery 100 which is ready for use.

As described above, in this embodiment, the positive electrode tabs 21t are sandwiched between the transparent material G and the current collecting unit 33, and laser LA is then applied to penetrate the transparent material G, whereby the current collecting unit 33 and the positive electrode tabs 21t are welded. In this embodiment, when the positive electrode tabs 21t are sandwiched between the transparent material G and the current collecting unit 33, the transparent material G is disposed on the electrode tabs 21t stacked on the current collecting unit 33, and the electrode tabs 21t are stacked on the current collecting unit 33 without a gap. Then, laser LA is applied to penetrate the transparent material G. Accordingly, the electrode tabs 21t are laser-welded to the current collecting unit 33 stacked thereon without a gap. This allows reduction in voids in the welded zone 91 between the electrode tabs 21t and the current collecting unit 33, and, in turn, allows reduction in increase of the battery resistance of the secondary battery 100.

The electrode body 20 includes multiple positive electrode tabs 21t. In this manufacturing method, the positive electrode tabs 21t stacked on each other are sandwiched between the current collecting unit 33 and the transparent material G. Here, the positive electrode tabs 21t and the current collecting unit 33 are stacked without a gap between them, and gaps between the positive electrode tabs 21t and the current collecting unit 33 are reduced. This allows further reduction in voids in the welded zone 91 between the positive electrode tabs 21t and the current collecting unit 33.

In this manufacturing method, in the welding, the laser LA is applied with the positive electrode tabs 21t, which is pressed with a pressure of 100 N or more by using the transparent material G. The positive electrode tabs 21t are pressed against the current collecting unit 33. Thus, the positive electrode tabs 21t and the current collecting unit 33 are stacked more effectively without a gap. This allows further reduction in voids in the welded zone 91 between the positive electrode tabs 21t and the current collecting unit 33.

The diameter $D_G$ of the contact surface G1 of the transparent material G used in this manufacturing method with the positive electrode tabs 21t is larger than the irradiation diameter $D_L$ of the laser LA. The portion (e.g., a welding planned portion) to which the laser LA is applied can be covered with the transparent material G. Thus, the effect of reducing voids in the welded zone 91 between the positive electrode tabs 21t and the current collecting unit 33 can be further achieved.

This manufacturing method includes washing the contact surface (the surface G1) between the transparent material G and the positive electrode tabs 21t after the welding. When the surface G1 of the transparent material G is washed, the transparent material G can be recycled. Further, deposits at the time of welding are removed by the washing, thereby further achieving the effect of reducing voids in the welded zone 91 between the positive electrode tabs 21t and the current collecting unit 33.

In this manufacturing method, a transparent material having a melting point of 800° C. or more is used as the transparent material G. This can reduce damage to the transparent material G during laser application and achieve more stable laser welding.

In this manufacturing method, at least one transparent material selected from crystallized glass, quartz glass, barium fluoride glass, calcium fluoride glass, and sapphire glass is used as the transparent material G is used. Such a material, which is a transparent material G, is suitable to achieve the effect of reducing voids in the welded zone 91 between the positive electrode tabs 21t and the current collecting unit 33.

By this manufacturing method, a secondary battery 100 can be manufactured. In the secondary battery 100, the positive electrode tabs 21t are laser-welded to the current collecting unit 33. As shown in FIG. 6, in the welded zone 91 between the positive electrode tabs 21t and the current collecting unit 33, the positive electrode tabs 21t and the current collecting unit 33 are welded with being stacked without a gap. The fact that the positive electrode tabs 21t and the current collecting unit 33 are welded with being stacked without a gap in the welded zone 91 can be examined by observation of the cross section along the direction in which the positive electrode tabs 21t and the current collecting unit 33 are stacked by using a scanning electron microscope (SEM), for example. For example, by the SEM observation, voids are not observed in the welded zone 91 between the positive electrode tabs 21t and the current collecting unit 33 (specifically, see Test Examples to be described later). When voids in the welded zone 91 between the positive electrode tabs 21t and the current collecting unit 33 is reduced, an increase in the battery resistance of the secondary battery 100 may be reduced.

In the secondary battery 100, the electrode body 20 includes multiple positive electrode tabs 21t. The positive electrode tabs 21t are welded to the current collecting unit 33 with the positive electrode tabs 21t stacked on each other. With such a configuration, voids generated in welded zones 91 between the positive electrode tabs 21t and the current collecting unit 33 are more suitably reduced.

The secondary battery 100 can be used for various applications. For example, the battery 100 can be suitably used as a power source (drive power source) for motors in vehicles such as passenger cars and trucks. Although not particularly limited thereto, examples of the vehicles include plug-in hybrid vehicle (PHEV), a hybrid vehicle (HEV), and electric vehicles (BEV).

The following describes Test Examples of laser welding between the positive electrode tabs 21t and the current collecting unit 33 in the secondary battery manufacturing method disclosed herein, which have been conducted by the present inventors.

EXAMPLE

As electrode tabs, sixty aluminum foils (A1050, thickness: 15 μm), and as a current collecting unit, an aluminum plate (A1050, thickness: 800 μm), and as a transparent material, cylindrical sapphire glass (the diameter: 10 mm) were provided. The aluminum foils are stacked, and then disposed on the aluminum plate. Then, the sapphire glass is disposed on the topmost surface of the aluminum foils stacked, and the aluminum foils are sandwiched between the aluminum plate and the sapphire glass. Subsequently, the aluminum foils are pressed against the aluminum plate with a pressure of 100 N by using a jig for spring load on the sapphire glass. With the pressing, fiber laser (wavelength: 1070 nm, irradiation diameter: 0.6 mm) is applied to penetrate the sapphire glass to weld between the aluminum foils and the aluminum plate.

COMPARATIVE EXAMPLE

Sapphire glass was not used. Tus, an aluminum foils were not sandwiched between the sapphire glass and an aluminum plate. The aluminum foils and the aluminum plate were welded by the same material and procedures as in Example except for this.

Figure 7:
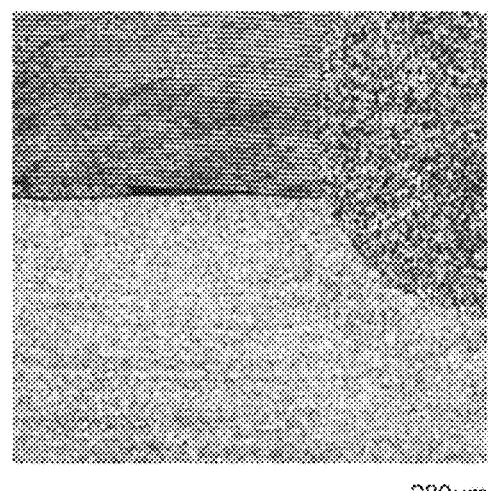
FIG. 7 is an SEM observation image of Example.
Figure 8:
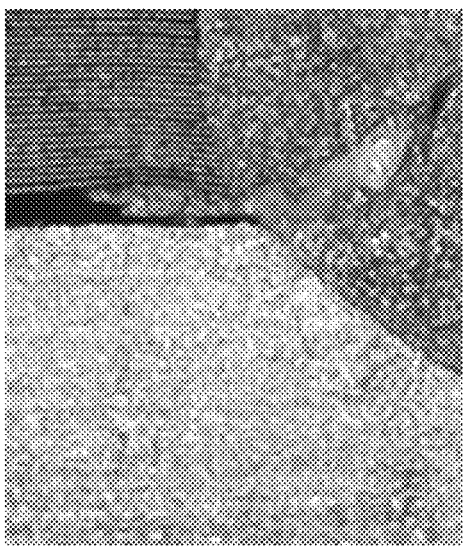
FIG. 8 is an SEM observation image of Comparative Example.

After the welding, the cross section of the welded zone between the aluminum foils and the aluminum plate of each of Example and Comparative Example was observed by using a SEM. The observation was performed at fifty-fold magnification. FIG. 7 is an SEM observation image of Example. FIG. 8 is an SEM observation image of Comparative Example. The scale bar shown in FIGS. 7 and 8 indicates 200 μm. In FIGS. 7 and 8, the lamination structure shown on the upper left side is stacked aluminum foils. The aluminum plate is shown below the lamination structure (the lower left side in FIGS. 7 and 8). A welded zone between the aluminum foils and the aluminum plate is shown on the right side of the lamination structure (the upper light side in FIGS. 7 and 8).

As can be seen from FIG. 7, in Example where aluminum foils are sandwiched between the sapphire glass and the aluminum plate and laser is then applied to penetrate the sapphire glass to weld between the aluminum foils and the aluminum plate, voids in the welded zone between the aluminum foils and the aluminum plate are reduced between the aluminum foils and the aluminum plate. As shown in FIG. 8, in Comparative Example where sapphire glass is not used, voids are observed in the welded zone between the aluminum foils and the aluminum plate.

Although specific examples of the technology disclosed herein have been described in detail above, they are mere examples and do not limit the appended claims. The technology described in the appended claims includes various modifications and changes of the foregoing specific examples.

For example, in the embodiment, welding between electrode tabs and the current collecting unit by using the transparent material G on the positive electrode side and the negative electrode was explained. However, the present disclosure is not limited thereto as long as welding between the electrode tabs and the current collecting unit by using the transparent material G is performed on at least either one of the positive electrode side and the negative electrode side.

In the embodiment, the number of electrode bodies 20 housed in the battery case 10 is one. However, the present disclosure is not limited thereto. For example, two electrode bodies 20 may be housed. In this case, for example, two electrode bodies 20 are disposed to be symmetrical so that the positive electrode tabs 21*t* face the current collecting unit 33 and the negative electrode tabs 22*t* face the current collecting unit 43 (see FIG. 4). Then, the positive electrode tabs 21*t* and the negative electrode tabs 22*t* are stacked on the current collecting unit 33 and the current collecting unit 43, respectively, and are then bonded.

In the embodiment, the positive electrode tabs 21*t* and the negative electrode tabs 22*t* are provided in the same end of the electrode sheet of the electrode body 20 in the lateral direction. However, the present disclosure is not limited thereto. The positive electrode tabs 21*t* may be provided in one end in the lateral direction, and the negative electrode tabs 22*t* may be provided in the other end.

The shape of the electrode body 20 is not limited to the shape. For example, in the embodiment, the electrode tabs each have a rectangular shape protruding from one end in the sheet lateral direction. However, the electrode tabs may be active material layer unformed portions provided to have a strip-like shape along the sheet longitudinal direction in one end in the sheet lateral direction, for example. For example, the positive electrode sheet and the negative electrode sheet having such active material layer unformed portions are stacked and wound so that positive electrode active material layer unformed portions protrude toward one side in the sheet lateral direction and negative electrode active material layer unformed portions protrude toward the other side. Then, the active material layer unformed portions for the positive and negative electrodes are formed into collector foils, which are then welded to the positive and negative current collecting units. A wound electrode body having such a shape may also be used. In the embodiment, the wound electrode body is used as the electrode body 20. However, the present disclosure is not limited thereto. The electrode body 20 may be a laminate electrode body obtained by stacking a rectangular sheet-like positive electrode sheet and a rectangular sheet-like negative sheet via a rectangular sheet-like separator.

What is claimed is:

1. A method of manufacturing a secondary battery comprising
   an electrode body comprising multiple electrode tabs, and
   a current collecting unit electrically connected to the electrode body via the multiple electrode tabs, the method comprising:
   stacking the multiple electrode tabs,
   disposing the stacked multiple electrode tabs on the current collecting unit,
   after disposing the multiple electrode tabs on the current collecting unit, sandwiching the multiple electrode tabs between a transparent material and the current collecting unit, wherein the transparent material is disposed on a topmost surface of the multiple electrode tabs disposed on the current collecting unit,
   pressurizing the multiple electrode tabs against the current collecting unit with the transparent material, and
   while pressurizing the multiple electrode tabs against the current collecting unit, welding between the multiple electrode tabs and the current collecting unit, with the multiple electrode tabs sandwiched between the transparent material and the current collecting unit, by applying a laser to penetrate the transparent material.

2. The method according to claim 1, wherein
   in the welding, the laser is applied with the multiple electrode tabs, which are pressed against the current collecting unit with a pressure of 100 N or more by the transparent material.

3. The method according to claim 1, wherein
   a diameter of a contact surface of the transparent material with the topmost surface of the multiple electrode tabs disposed on the current collecting unit is larger than an irradiation diameter of the laser.

4. The method according to claim 1, further comprising:
washing a contact surface between the transparent mate-
rial and the multiple electrode tabs after the welding.

5. The method according to claim 1, wherein
the transparent material has a melting point of 800° C. or
more.

6. The method according to claim 5, wherein
the transparent material is crystallized glass, quartz glass,
barium fluoride glass, calcium fluoride glass, or sap-
phire glass.

7. The method according to claim 1, wherein
each of the multiple electrode tabs is a foil, and
the current collecting unit is in a plate-shape and has a
larger thickness than the foil.

8. The method according to claim 1, wherein
the transparent material is in a cylindrical shape or a
polygonal prism shape,
in the welding, the laser penetrates through the transpar-
ent material and is applied to the multiple electrode tabs
which are pressed by the transparent material against
the current collecting unit with a pressure of 100 N or
more and 200 N or less.

* * * * *